Figure 1:
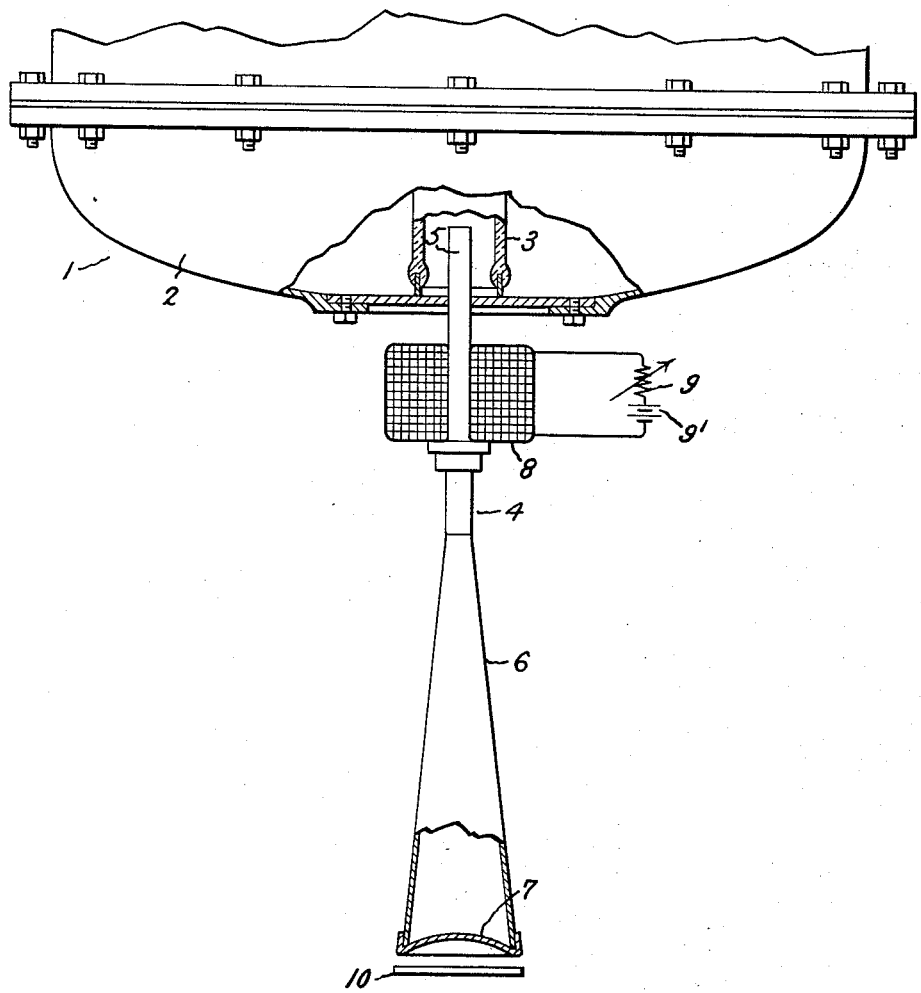

Jan. 9, 1968 E. J. LAWTON 3,362,897
STABLE IRRADIATED POLYETHYLENE
Original Filed Nov. 21, 1956 2 Sheets-Sheet 1

Inventor:
Elliott J. Lawton,
by Paul A. Frank
His Attorney.

Jan. 9, 1968  E. J. LAWTON  3,362,897
STABLE IRRADIATED POLYETHYLENE
Original Filed Nov. 21, 1956  2 Sheets-Sheet 2
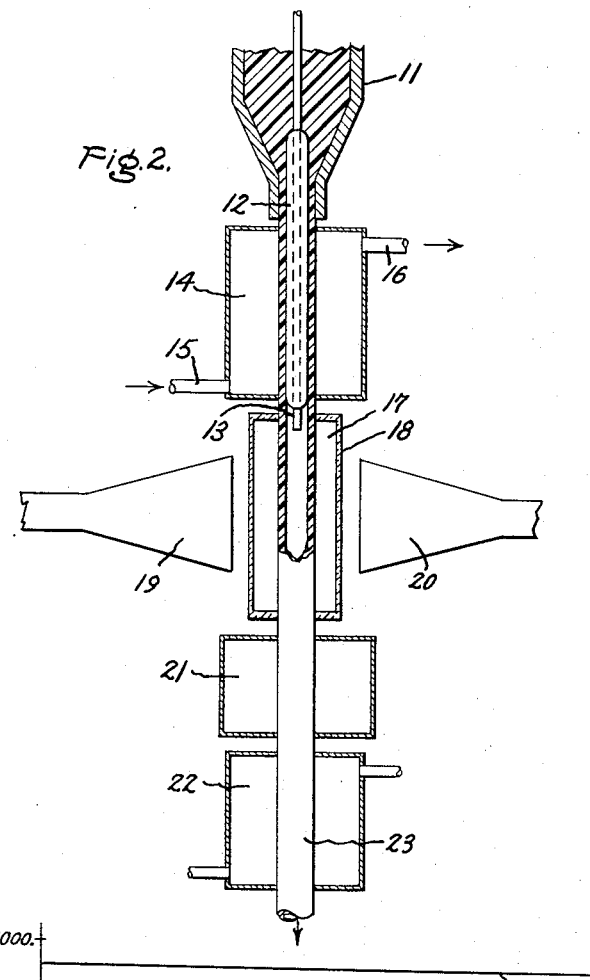
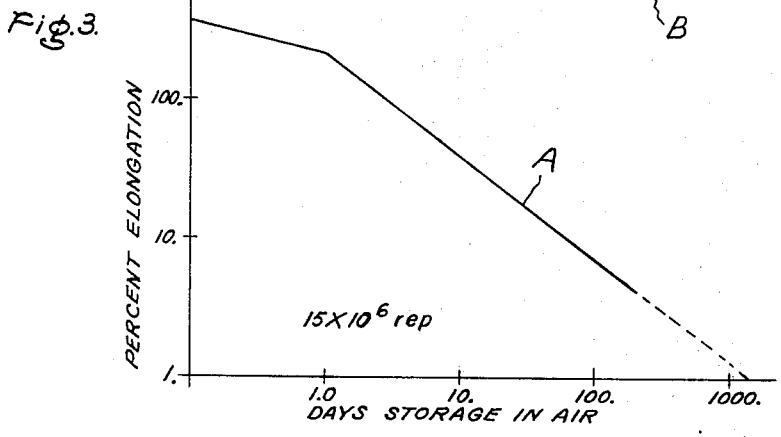
Inventor:
Elliott J. Lawton,
by Paul A. Frank
His Attorney.

United States Patent Office 3,362,897
Patented Jan. 9, 1968

3,362,897
STABLE IRRADIATED POLYETHYLENE
Elliott J. Lawton, Schenectady, N.Y., assignor to General Electric Company, a corporation of New York
Continuation of application Ser. No. 623,701, Nov. 21, 1956. This application Nov. 21, 1962, Ser. No. 240,201
5 Claims. (Cl. 204—159.2)

This application is a continuation of my copending application Ser. No. 623,701, filed Nov. 21, 1956, and assigned to the same assignee as the present invention and now abandoned.

This invention relates to stable high energy irradiated polyethylene. Still more particularly, this invention relates to a process of preparing stable high energy irradiated polyethylene which comprises treating polyethylene with high energy radiation and thereupon heating the irradiated polyethylene to render it less crystalline than at the irradiation temperature or substantially amorphous. This treatment produces irradiated polyethylene which is more stable toward oxygen or air than irradiated polyethylene which has not been rendered less crystalline after irradiation.

In the gamut of polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes. Despite all this, however, the applications of polyethylene are greatly limited by its lack of "form stability," i.e., the ability to retain a particular shape at elevated temperatures, and by its poor high temperature properties, such as poor high temperature tensile strength, tear strength, cut-through strength, etc.

In the copending application of Lawton and Buche, Ser. No. 130,821, filed Aug. 1, 1961 as a division of Ser. No. 324,552, filed Dec. 6, 1952, now abandoned, both assigned to the same assignee as the present invention, there is disclosed a method of enhancing the high temperature properties, etc. of polyethylene wherein an improved polyethylene is obtained by subjecting the latter to high energy electrons.

Irradiated polyethylene produced by this process has excellent properties, such as, for example, the property of being substantially infusible at elevated temperatures, has reduced solubility in solvents in which the unirradiated material is soluble, has improved resistance to stress cracking, etc. Although irradiated polyethylene has these excellent properties, it has been found that there is a greater tendency for irradiated high density (hereafter defined) polyethylene to degrade in the presence of oxygen or air as compared to low density (hereafter defined) polyethylene. Because of this lack of resistance to oxidation, applications for high density irradiated polyethylene have been somewhat curtailed, especially in electrical applications where oxidation resistance is usually an essential requirement.

I have now discovered that the oxidative stability of irradiated polyethylene, particularly of high density polyethylene, can be enhanced by a process which comprises treating polyethylene with high energy radiation and thereupon heating the irradiated polyethylene to render it less crystalline or substantially amorphous (also referred to as "annealing").

The features of the invention desired to be protected are pointed out with particularity in the appended claims. The invention itself, together with further advantages resulting from the process, may best be understood by reference to the following description, taken in connection with the accompanying drawing in which:

FIG. 1 is a partially sectionalized, simplified view of an electron accelerator apparatus useful in practicing the invention.

FIG. 2 schematically represents a process of preparing a stable, filled irradiated polyethylene pipe according to this invention.

FIG. 3 is a graph wherein percent elongation of irradiated polyethylene is measured as a function of days in air. The polyethylene of Curve A had not been annealed following irradiation while the polyethylene of Curve B had been annealed at 130° C. immediately following irradiation.

The polyethylene referred to herein is a polymeric material formed by the polymerization of ethylene. One type of polyethylene is that of low density (0.91–0.93) which is prepared by polymerizing ethylene at high temperatures and pressures. It is described in Patent 2,153,553—Fawcett et al., and in "Modern Plastics Encyclopedia," New York, 1949, pp. 268–271. Specific examples of commercially available low density polyethylene are the polyethylenes sold by E. I. du Pont de Nemours & Co., Inc., Wilmington, Del., examples of which are sold under the trade name of "Alathon," its properties, uses, etc. being set forth in DuPont Information Bulletin A-3584; those sold by the Bakelite Company, such as DE-2400, DYNH, etc. Other low density polyethylenes of various molecular weights are described by Lawton et al. in "Industrial & Engineering Chemistry" 46, pp. 1703–1709 (1954). Also available as a commercial product are the intermediate density (0.926–0.940) polyethylene.

Another type of polyethylene particularly useful in my invention is high density (0.94–0.98) polyethylene which has higher tensile strengths, higher temperature resistances, greater rigidity, etc. than low density polyethylene and have been referred to in the literature as "high density," "low pressure," "high-modulus," "high-temperature" and "high-tensile" etc. polyethylene. For convenience, in this specification the low density polyethylene will be called "LD" polyethylene and the high density polyethylene will be called "HD" polyethylene.

Generally, three different processes have been used to prepare HD polyethylene, differing principally from LD methods in that much lower pressures and higher catalytic activities are required. The method developed by the Phillips Petroleum Company described, for example, in Belgian Patent 530,617, etc. employs as a catalyst hexavalent chrome oxide on a 10% alumina 90% silica carrier. The temperature of operation is about 155° C. and only enough pressure (100–500 p.s.i.) to liquefy the diluent (pentane, octane, etc.) is required. These are sold by Phillips under the trademark of "Marlex."

The second method developed by Karl Ziegler described, for example, in British Patent 713,081, in Belgian Patent 533,362, etc. employs a catalyst in the form of an activated metal-organic complex having the general structure $Me(R)_n$ wherein Me is beryllium, aluminum, gallium, indium, etc. and R comprises an organic radical, for example alkyl, aryl, etc. In the Ziegler process the temperature can vary from 60–250° C. and the pressure from about 1–2000 atmospheres.

A third method of preparing high density polyethylene has been developed by Standard Oil of Indiana wherein the catalyst is a reduced metal oxide such as a reduced molybdenum oxide supported on a difficultly reducible carrier such as gamma alumina, titanium, zirconium, etc. has been described in various U.S. patents, for example in U.S. Patent 2,728,754, etc. Group VI-A oxides in combination with complex metal alumina hydrides are also described as catalysts in U.S. Patents 2,731,453, 2,692,257, etc.

When crystalline-type high polymers such as polyethylene are cooled, they tend to form micro crystals which impart opacity to the solid polymer. The spherical outlines of these crystals and their attached amorphous regions which can range from submicroscopic regions to regions which are readily visible under the microscope are known as spherulites. Although total crystallinity should be theoretically possible, in practice total crystallinity, even at very low temperatures, appears to be prevented by some branching in the polyethylene chain. The degree of crystallinity varies with temperature and the specific polyethylene employed, the HD polyethylene being very much more crystalline than the LD polyethylenes.

As the temperature of polyethylene is raised, the change from a crystalline to an amorphous state occurs at temperatures which are below those generally taken as the polymer's flow point. Although this transition of structure extends over a range, the commercial LD polymer is substantially amorphous at about 100–110° C. and HD 120 to 150° C. or higher. Above this temperature, which is called the crystal melting point, molecular order is substantially destroyed and the material becomes completely amorphous.

I have discovered that the greater part of the cross-linking in polyethylene occurs in the amorphous part of the polymer and that crystallinity appears to "trap" free-radicals formed by radiation. These crystalline-trapped free-radicals do not readily cross-link polyethylene but activate polyethylene so that it is very readily attacked by oxygen. This oxygen attack is much more pronounced with the HD polymers since their highly crystalline state traps a greater proportion of free-radicals than LD polyethylene.

However, I have found that by reducing crystallinity after irradiation, such as by rendering the polymer substantially amorphous, these trapped free-radicals are released so that the polymer is more resistant to oxidation. I have also unexpectedly discovered that these released free-radicals instead of degrading the polymer by causing oxidative attack are now freed to further enhance the properties of the polymer by additional cross-linking, thus resulting in a reduction of the cost of radiation. Thus, when an HD polyethylene like Marlex-50 is irradiated with $15 \times 10^6$ rep at 25° C. with no subsequent heat treatment, the product degrades and becomes brittle within four days. In contrast, when the same polymer is irradiated with the same dose but thereafter heated at 130° C. for 6 minutes, it exhibits no degradation or brittleness even after 128 days.

The significance of this discovery is that irradiation cross-linked polyethylene is not only rendered less susceptible to oxidation but also less expensive to prepare because cross-linking efficiency is enhanced. This increase in cross-linking efficiency is illustrated in FIG. 3, where it is shown that the irradiated sample which has been annealed has a higher percent elongation than the irradiated sample which has not been annealed even when measured immediately after they are irradiated and not stored in air. Furthermore, unless an HD polyethylene which has been irradiated at about room temperature is annealed, it degrades within a short period of time to a useless, brittle material.

In addition to rendering unfilled polyethylene less susceptible to oxidative attack, the process of this invention has a similar effect on filled polyethylene. Thus, a large variety of fillers can be used in my invention. Irradiated filled polyethylene is described and claimed in the copending application of Gilbert et al. Ser. No. 488,304, filed Feb. 15, 1955, now U.S. 3,084,114, and assigned to the same assignee as the present application wherein an improved polyethylene is obtained by subjecting filled polyethylene (e.g., polyethylene containing carbon black, silica, alumina, calcium silicate, etc.) to high energy radiation, for instance, high energy electrons. The fillers disclosed in this Gilbert et al. application are useful in the present application. The amount of filler advantageously present will, of course, depend on the particular filler employed and its surface characteristics, etc. may range from 1% to 60% or more based on total weight, the preferable range being 20–40%.

A large variety of fillers can be used in my invention. The most desirable fillers are those which are capable of enhancing the elevated temperature properties of irradiated polyethylene. As a class, inorganic and carbonaceous (i.e., colloidal carbon) fillers give excellent results. Inorganic fillers also include inorganic fillers which have been rendered hydrophobic with organic groups, such as surface-esterified silicas, trimethyl-chlorosilane-treated silicas, etc. Examples of such inorganic and carbonaceous fillers are silica xerogels, silica aerogels, fumed silicas, hydrophobic silicas, metal silicates, such as calcium silicate, etc., titanium dioxide, zinc oxides, metal carbonates, such as calcium carbonate, magnesium carbonate, etc., boron compounds, such as boron oxides and carbides, carbon blacks, etc. Of the class of inorganic and carbonaceous fillers, silicas, aluminas, calcium silicates and carbon blacks are preferred. As a general rule, it is desirable to use a filler having a surface area of about one or more square meters per gram but preferably more than about 40 square meters per gram.

A class of silicas useful for my invention are those having numerous pores or voids therein. These porous materials having exposed surfaces within the particles so that liquids and gases can penetrate to the surfaces of the pore walls are three-dimensional networks whose surfaces are extended by open pores.

The preparation of high surface area silicas and the chemical changes that occur when silicic acid goes to silica gel or hydrated silica are described in "Natural and Synthetic High Polymers," by K. M. Meyer, page 85 (1942) and in Hurd, "Chemical Reviews," vol. 22, No. 3, page 403, (1938).

A typical method of preparing precipitated silica comprises precipitating silica by the addition of $H_2SO_4$ to a sodium silicate solution and working the gel relatively free of salts with water. If water is evaporated from the gel in this state, the latter shrinks considerably in volume due to the force exerted on the solid phase of the gel by the surface tension of the liquid as it recedes in the pores of the material. These materials, which are called xerogels, can be used in this process.

In contrast to xerogels, aerogels are composed of the original solid phase gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point, the liquid will be converted into the gaseous state without the formation of menisci at the gas-liquid interface. The degree of porosity may be controlled to a large degree by controlling the concentration of the silica in the gel as it is precipitated. These aerogels may be used in this condition or they may be ground to a finer state of subdivision.

An example of an aerogel is Santocel-C marketed by Monsanto Chemical Company which has a specific surface area of about 160 square meters per gram.

Silicas prepared by other methods may also be used, for example, by burning various silicon-containing compounds, such as silicate esters (Patent 2,399,687—McNabb) and silicon tetrachloride. An example of a fumed silica (i.e., prepared from burning $SiCl_4$) is "Cab-O-Sil" (also called "Aerosil") which has a surface area of about 200 square meters per gram. (Godfrey L. Cabot Inc., Boston, Mass.)

In contrast to the above-described hydrophilic silicas (i.e., possessing water affinity) are those silicas which have been rendered hydrophobic by chemical treatment, examples of which are the alkyl-surface-esterified type described in Patent 2,657,149—Iler, of which the butyl ester is marketed as Valron (also called G. S. silica) by Du Pont Chemical Company and silicas which have been treated with various alkyl chlorosilanes in the manner of Patents 2,510,661, 2,563,555, both granted to Safford and assigned to the same assignee as the present invention, and 2,584,085—Stross.

Silicas prepared by various methods may be treated with heavy metal salts or hydrous heavy metal oxides to prepare heavy metal silicates which are water insoluble and usually amorphous. An example of a precipitated hydrated calcium silicate containing aggregates of particles of the order of 30–50 m$\mu$ is described in "Chemical & Engineering News" 24, page 3147 (1946) and marketed as "Silene EF'" by Columbia Chemical Division of the Pittsburgh Plate Glass Company.

Another type of filler that can be used is alumina, high surface area alumina being preferred. Among these high surface area compounds are such aluminas as (1) hydrated aluminum oxide (C–730) made by Aluminum Company of America which comprises 34.7% combined water and 64.4% $Al_2O_3$ (chemically aluminum trihydrate) and is of an average particle size of about 0.5 micron, (2) activated (dehydrated) aluminum oxide which is dehydrated C–730 obtained by heating for 64 hours at 480° F. to remove 28% of the combined water, (3) activated (dehydrated) alumina produced by calcining at elevated temperatures to remove essentially all the combined water, (4) alpha alumina, made by Linde Air Products Company, average particle size of about 0.3 micron, (5) gamma alumina, such as Alon I, manufactured by Godfrey L. Cabot, Inc., of Boston, Mass.

Gamma alumina ($Al_2O_3$) having a certain crystalline structure is prepared in such a way that it is different from most of the common aluminum oxides now available. One method of preparing gamma alumina is to vaporize the anhydrous aluminum chloride by heating it, said heating being carried out with natural gas. The water formed as a result of the combustion hydrolyzes the aluminum chloride in the vapor state, which at a temperature of about 500° F. (which characterizes the low temperature designation of the gamma alumina) dehydrates and converts to a fine particle size gamma aluminum oxide which is then collected and freed of excess hydrogen chloride. The average particle size of this particular alumina (as shown by agreement between electron microscope examination and nitrogen adsorption methods) is very small and is for the most part less than about 100 millimicrons in size, average particle size being from about 20 to 40 millimicrons. The particles are generally of uniform size and shape and the surface area of the gamma alumina is within the range of from about 40 to 130 square meters per gram. Another method for making this gamma alumina is to vaporize anhydrous aluminum chloride and hydrolyze it in the vapor state with high temperature steam, whereby the actual hydrolysis takes place preferably at around 500° F. The gamma alumina, having a hazy X-ray gamma structure, undergoes a change to a sharp gamma structure as the temperature is raised progressively up to around 900° C., where a transition to a sharp alpha pattern takes place. More detailed information regarding gamma alumina may be found disclosed in the article by M. H. Jellinek and I. Fankuchen, "X-Ray Diffraction Examination of Gamma Alumina" in "Industrial & Engineering Chemistry," page 158, February 1945.

Many types of finely divided carbon blacks can be used in my invention, such as animal or vegetable, channel, furnace and thermal carbon blacks, etc. A good description of the preparation of carbon blacks is contained in Faith et al., "Industrial Chemicals," pages 174–182, published by John Wiley & Sons, New York (1950). Among the various grades of suitable carbon blacks are channel; channel, conducting; channel, hard processing; channel, medium processing; channel, easy processing; furnace, conducting; furnace, fine; furnace, high modulus; furnace, high elongation; furnace, reinforcing; furnace, semi-reinforcing; thermal fine; thermal medium; acetylene; lampblack, etc.

A partial list of some of the fillers useful in my invention is presented below in Table I.

TABLE I

| Filler | Description | Particle Size, m$\mu$ | Source |
|---|---|---|---|
| Aerosil (Cab-O-Sil) | Fumed silica | 15–20 | Godfrey L. Cabot. |
| Valron | Hydrophobic silica aerogel | 6–7 | DuPont. |
| Hisil X303 | Precipitated silica | 20–30 | Columbia Southern. |
| Hisil 101 | do | 20–30 | Do. |
| Santocel-C | Silica aerogel | 10 | Monsanto. |
| Hisil 233 | Precipitated silica | 25 | Columbia Southern. |
| Syloid 244 | do | 2–3×10$^3$ | Davison Chemical. |
| Silene EF | Hydrated, precipitated calcium silicate. | 2–3×10$^2$ | Columbia Southern. |
| Clay 33 | Aluminum silicate | 2×10$^3$ | Southern Clay. |
| P-33 | Fine Thermal Black | 170 | R. T. Vanderbilt Co. |
| Micronex W6 | Easy Processing Channel Black (EPC) | | Benney and Smith Co. |
| Phil Black O | HAF (High Abrasion Furnace) | 45 | Phillips Petroleum. |
| Vulcan 9 | SSF Carbon Black | 60 | Godfrey L. Cabot. |
| Alon C | $Al_2O_3$ (gamma) | 5–40 | Do. |

In FIG. 1 there is shown high voltage accelerating apparatus 1 capable of producing a beam of high energy electrons for irradiating polymeric materials in accordance with the invention. High voltage accelerating apparatus 1 may be of the type disclosed in Patent 2,144,518—Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned Westendorp patent and in "Electronics," vol. 17, pp. 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end window 7 which may be hermetically sealed to tube 4 by means of silver solder. End window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater.

Beryllium and other materials of low stopping power may also be employed effectively. By forming end window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing irradiated polyethylene according to the invention, a sheet 10 of polyethylene is supported in the path of the electrons emerging from end window 7 as illustrated. The high energy electrons penetrate the polymeric material to a depth dependent upon their energy and effect the above modifications in the properties of the material. Of course, sheet 10 can be in the form of strip material which is passed continuously under end window 7 at a velocity selected to give the desired irradiation dosage. Other expedients for obtaining the irradiation of the polymeric materials in various shapes (e.g., bottles, cups, tubing, filaments, pipes, etc.) will be apparent to those skilled in the art. Uniform treatment of polymeric materials having appreciable thickness can be assured by irradiating them first from one side and then from the other or in some cases from both sides simultaneously. In certain instances, it may be desirable to irradiate the polymeric materials in an atmosphere of nitrogen, argon, helium, krypton or xenon, etc., to prevent the damaging effect of any corona which may be present.

The most commonly employed units for measuring high energy radiation are (1) Roentgen units and (2) Roentgen equivalent physical units. Roentgen units are more commonly used to measure gamma and X-rays and are usually defined as the amount of radiation that produces one electrostatic unit of charge per milliliter of dry air under standard conditions. The Roentgen equivalent physical unit (the "rep") is a convenient unit which usually describes the radiation dose from other than gamma or X-rays, and is the measure of the ionization in the absorber or tissue. The ionization produced by primary radiation is expressed as one rep when the energy lost in tissue is equivalent to the energy lost by the absorption of one Roentgen of gamma or X-rays in air. Further definitions of "Roentgen" and "rep" can be found on page 256 of "The Science and Engineering of Nuclear Power" edited by Clark Goodman (1947) and on page 436 of "Nuclear Radiation Physics" by Lapp and Andrews (1948). For convenience, the term "Roentgen equivalent physical" or "rep" will be used in the specification and appended claims.

The suitable radiation dose employed in carrying out this invention will, of course, depend upon the properties desired in the irradiated product and the particular polyethylene employed. For example, doses of above $1 \times 10^6$ rep such as from about $1 \times 10^6$ to $50 \times 10^8$ rep, but preferably 1 to $20 \times 10^6$ rep can be employed.

Since no benefit accrues from delaying the heating step after the polyethylene is irradiated, generally the polyethylene is annealed immediately after irradiation at the lower temperature by any suitable means such as by passing through a heated post-irradiation zone. By annealing immediately, I mean annealing before a substantial amount of oxygen has an opportunity to react with the trapped free-radicals so as to degrade the polymer. Preferably the irradiated polymer should be annealed at from about 90° C. (i.e., 85–95° C.) to just below its melting point so as to render it substantially amorphous without allowing the irradiated product to lose its shape.

Although the irradiation and heating are performed conveniently as two consecutive process steps to minimize the contact time of the irradiated polyethylene with the oxygen in the atmosphere, the heating step may be delayed. It is to be recognized that if air or oxygen is not excluded from contacting the irradiated polyethylene during such delay that oxidative degradation will occur. The amount of degradation increasing with the amount of oxygen which reacts with the irradiated polyethylene. The amount of oxygen that will react will be dependent on the concentration of oxygen in the atmosphere contacting the irradiated polyethylene, the concentration of trapped radicals in the irradiated polyethylene and the time of contact of irradiated polyethylene with the oxygen containing atmosphere.

Once the irradiated polyethylene has been annealed, the trapped radicals are destroyed and no further oxidative degradation occurs but the annealing does not restore or repair the damage already done by the reaction of the trapped radicals with oxygen. Therefore, if there is to be a delay between the irradiation step and the annealing step that the contact with oxygen during such delay should be minimized.

One method of assuring against oxidative attack is to irradiate in an inert atmosphere and to keep the irradiated polymer in this inert atmosphere until it has been annealed. Where the polymer is kept out of contact with oxygen, delay in annealing is permitted without deleterious effects.

Another method is to pass the irradiated polyethylene, as it emerges from the irradiation zone without interruption into a heating zone where it is annealed. If the form of the polyethylene permits, e.g., if it is an elongated object, for example, a film, pipe, tubing, fiber or a coating on a substrate, a coating on wire, etc., the irradiated but not annealed polyethylene may be coiled or rolled up on spools, cones, bobbins, etc. so that the outer layer, although exposed to air, protects the balance of the coil or roll from attack until it is annealed by oxygen. Alternatively, a protective covering may be used to enwrap the irradiated polyethylene to exclude oxygen from the tube, coil or roll until the irradiated polyethylene is heated. Irradiated sheets of polyethylene may be stored in close fitting containers, etc. to avert contact with the oxygen in air. Other methods of minimizing, repressing, impeding or completely preventing contact of oxygen with the polyethylene after it is irradiated and before it is annealed will be readily apparent to those skilled in the art of irradiation.

It will be readily realized that other forms of electron accelerating apparatus may be employed instead of high voltage apparatus 1, for example, linear accelerators of the type described by J. C. Slater in the "Reviews of Modern Physics," vol. 20, No. 3 pages 473–518 (July 1948) may be utilized. To decrease wasteful energy absorption between the point of exit of electrons from the accelerating apparatus and the polymeric materials, a vacuum chamber having thin entrance and exit windows may be inserted in the space.

In general, the energy of the irradiation preferably employed in the practice of my invention may range from about 50,000 to 20 million electron volts or higher depending upon materials and the shape and thickness of the materials. The preferable range is 100,000 to 10 million electron volts. Although high energy electron irradiation is preferred since it produces a large amount of easily controllable high energy, ionizing radiation within a short period of time without rendering the product radioactive, many other sources of high energy, ionizing irradiation may also be used in my invention. Examples of such ionizing radiation sources are gamma rays, such as can be obtained from $Co^{60}$, "burnt" uranium slugs, fission by-products, such as waste solution, separated isotopes, such as $Cs^{137}$, gaseous fission products liberated from atomic reactions, etc.; other electron sources, such as the betatron etc.; fast or slow neutrons or the mixed neutron and gamma radiation, such as is present in certain atomic reactors; X-rays; and other miscellaneous sources, such as protons, deuterons, α-particles, fission fragments, such as are available from cyclotrons, etc.

In order that those skilled in the art may better understand how the present invention may be practiced, the following examples are given by way of illustration and not by way of limitation. All parts are by weight. The apparatus employed was that described in FIG. 1 with 800 kvp. electrons (kvp. refers to the peak voltage in kilovolts generated by the inductance coil with high voltage apparatus 1 during the conducting half cycle and thus a measure of the energy emerging from window 7).

*Example 1*

The following example illustrates the effect of annealing on the percent elongation of HD polyethylene (Marlex–50, Phillips Petroleum Co.) which had been treated with high energy radiation.

Sections of HD polyethylene are irradiated at 25° C. to a dose of $15 \times 10^6$ rep. One group (A) which is given no further treatment after irradiation is kept as a control, while the other group (B) is annealed at 130° C. immediately following irradiation. These samples are stored at room temperature in contact with air. Over a period of from zero to 128 days ultimate percent elongation measurements are determined on the samples of both A and B. For each member of Group B measured, a corresponding measurement is made on Group A. These results are presented in the graph, FIG. 3, where percent ultimate elongation is plotted as a function of days of storage in air. Curve A refers to the measurements taken on Group A, and Curve B those taken on Group B.

In contrast to the excellent stability shown in Curve B where substantially no decrease in percent ultimate elongation is noted, the percent elongation shown in Curve A decreases from an initial value of 400% to a very low value of about 6%. Since percent elongation is a property of a polymer which is sensitive to molecular weight changes, it is believed the radicals trapped in the crystals of polyethylene enhanced the rate of oxygen attack on the polymer, thus reducing its molecular weight.

*Example 2*

A stable irradiated HD tape suitable for electrical insulation is prepared by irradiating a 5 mil tape of Marlex–50 to a dose of $15 \times 10^6$ rep and immediately annealing at 130 ° C. This stable tape is suitable for wrapping metallic electrical conductors, such as copper wise, etc.

*Example 3*

One hundred parts of HD polyethylene (Marlex–50) are milled with 30 parts of carbon black (Vulcan 9, Cabot Co.) and then calendered to form a 5 mil tape. A stable, irradiated semi-conducting tape is prepared from this material by irradiating it to a dose of $15 \times 10^6$ rep and immediately annealing at 130° C. following irradiation.

*Example 4*

HD polyethylene is valuable in preparing commercial pipe, particularly when it contains a reinforcing filler such as carbon black. For example, high energy irradiated ($12.3 \times 10^6$ rep) and annealed (130° C.) Marlex–50 pipe containing 35% carbon black (Vulcan 9, The Cabot Co.) has a room temperature yield strength of about 6000 p.s.i. as compared to a similarly treated and similarly filled LD polyethylene (Alathon I) which has a room temperature yield strength of about 2500 p.s.i.

The annealing process of my invention can be employed to prepare stable polyethylene pipe. A convenient method of continuously preparing the pipe is shown in FIG. 2.

In the extruder head 11 of FIG. 2 there are mixed 35 parts of carbon black and 65 parts of HD polyethylene (Marlex–50) until a homogeneous mixture is obtained. This admixed filled polymer is extruded and shaped by means of a guide mandrel 12 which forms the pipe around the air vent for the extruded pipe 13. The pipe is then passed through a pre-irradiation conditioning zone 14 through which flows a temperature conditioning medium such as water, steam, etc. entering through inlet 15 and leaving through outlet 16. The pipe is then passed through a radiation zone 17 which has a thin wall chamber transparent to an electron beam 18. While in this irradiation zone the pipe is irradiated by means of electron beams 19 and 20. After the pipe is irradiated, it is passed through an annealing zone 21 where it is heated according to this invention to increase its stability. Then the pipe is passed through zone 22 where it is then cooled. Upon leaving the cooling zone, the finished pipe 23 is then taken up on a suitable means, such as, for example, a take-up reel. By this process oxidatively stable, filled polyethylene pipe is produced.

*Example 5*

An HD polyethylene (Marlex–50) is extruded and annealed in the manner of Example 4 except that no filler is employed, producing an oxidatively stable polyethylene pipe.

*Example 6*

A stable HD polyethylene insulated copper wire is prepared according to this invention by using a 0.060″ die to extrude and cover a 0.032″ copper wire. An apparatus similar to the one illustrated in FIG. 2 and in Example 4 is employed to cover the wire except that a die and a wire are used in place of a mandrel. An irradiation dose of $15 \times 10^6$ rep and an anneal temperature of 130° C. are employed.

The products of this invention can be used as an improved polyethylene in those applications where irradiated polyethylene has heretofore been employed. Thus, they can be used as electrical insulating tapes, conducting tapes, as fluid conduits, pipes, containers, wire coatings, etc.

While the present invention has been described by reference to particular embodiments and examples thereof, variations will readily occur to those skilled in the art. It is, therefore, intended in the appended claims to cover all equivalents as may be in the true spirit and scope of the foregoing description. In addition, various modifying agents, such as dyes, pigments, stabilizers, for example, di-β-naphthyl-p-phenylene diamine, etc. may be added to the polyethylene compositions without departing from the scope of the invention.

What I claim as new and desire to secure by Letters Patent of the United States is:

1. The process of stabilizing irradiated polyethylene against oxidative attack when exposed to an oxygen-containing atmosphere, due to the presence of trapped free radicals in said polyethylene, which comprises (1) treating solid, crystalline polyethylene with ionizing radiation having energy equivalent to at least $5 \times 10^4$ electron volts to a dose of $1 \times 10^6$ to $50 \times 10^8$ rep, thereby creating trapped free radicals in the irradiated polyethylene, (2) minimizing contact of oxygen with the irradiated polyethylene containing trapped free radicals between the time the polyethylene is irradiated and heated by providing an irradiation zone and a heating zone, and passing the polyethylene from the irradiation zone into the heating zone without interruption, and (3) heating the irradiated polyethylene to a temperature where the polyethylene is in a solid substantially amorphous state to destroy substantially all of the radiation-induced free radicals trapped in the polyethylene, before they react with oxygen.

2. The process of stabilizing irradiated polyethylene against oxidative attack when exposed to an oxygen-containing atmosphere, due to the presence of trapped free radicals in said polyethylene, which comprises irradiating an elongated object comprising solid, crystalline polyethylene to a dose of $1 \times 10^6$ to $50 \times 10^8$ rep with a beam of ionizing radiation having energy equivalent to at least $5 \times 10^4$ electron volts thereby creating trapped free radicals in the irradiated polyethylene, heating the irradiated polyethylene as it comes from the beam of ionizing radiation to a temperature where the polyethylene is in a solid, substantially amorphous state to destroy substantially all of the radiation-induced free radicals trapped in the polyethylene before they react with oxygen.

3. The process of claim 2 wherein the elongated object is an elongated sheet of polyethylene.

4. The process of claim 2 wherein the elongated object is polyethylene pipe.

5. The process of claim 2 wherein the polyethylene which is irradiated is high density polyethylene.

References Cited

UNITED STATES PATENTS

| | | | |
|---|---|---|---|
| 2,929,744 | 3/1960 | Mathes et al. | 204—159.2 |
| 2,967,137 | 1/1961 | Lawton | 204—159.2 |
| 2,940,869 | 6/1960 | Graham | 204—159.14 |
| 2,956,899 | 10/1960 | Cline | 204—159.12 |
| 2,989,451 | 6/1961 | Prochaska | 204—159.2 |
| 3,088,791 | 5/1963 | Cline et al. | 204—159.12 |

OTHER REFERENCES

"Modern Plastics," vol. 31, pp. 100, 101, 219, April 1954.

Nature, vol. 170, December 1952 (pp. 1075–76).

Dole et al., Journal American Chem. Soc., vol 76, pp. 4304–4311, Sept. 5, 1954.

MURRAY TILLMAN, *Primary Examiner.*

S. H. BLECH, W. L. BASCOMB, *Examiners.*

R. B. TURER, N. F. OBLON, *Assistant Examiners.*